United States Patent [19]

Mueller

[11] 4,230,076
[45] Oct. 28, 1980

[54] CONTROL FOR VALVE DISABLERS

[75] Inventor: Robert S. Mueller, Birmingham, Mich.

[73] Assignee: Eaton Corporation, Cleveland, Ohio

[21] Appl. No.: 610,719

[22] Filed: Sep. 5, 1975

[51] Int. Cl.³ .......................... F02D 13/06; F01L 1/18
[52] U.S. Cl. .............................. 123/90.16; 123/90.43; 123/198 F
[58] Field of Search .............. 123/198 F, 90.15, 90.16, 123/90.23, 90.32, 90.41, 90.43, 90.47

[56] References Cited

U.S. PATENT DOCUMENTS

| | | | |
|---|---|---|---|
| 1,797,105 | 3/1931 | Shoblom | 123/90.41 |
| 1,930,568 | 10/1933 | Short | 123/90.43 |
| 2,392,933 | 1/1946 | Mallory | 123/198 F |
| 2,443,999 | 6/1948 | Wright | 123/198 F |
| 2,934,052 | 4/1960 | Longenecker | 123/90.16 |
| 2,997,991 | 8/1961 | Roan | 123/90.16 |
| 3,166,057 | 1/1965 | Konrad et al. | 123/90.16 |
| 3,413,965 | 12/1968 | Gauasso | 123/90.16 |
| 3,422,803 | 1/1969 | Stivender | 123/90.16 |
| 3,470,857 | 10/1969 | Stivender | 123/90.43 |
| 3,964,455 | 6/1976 | Brown | 123/90.16 |

FOREIGN PATENT DOCUMENTS 864080  4/1941  France ................... 123/198 F

Primary Examiner—Ira S. Lazarus
Attorney, Agent, or Firm—R. J. McCloskey; D. Wood; P. Rulon

[57] ABSTRACT

An improved valve disabler control for a multi-cylinder engine having individually pivoted rocker arms and an intake and exhaust valve pair for each cylinder. Half of the valve pairs are provided with valve disablers having rotatable sleeves. Rotation of the sleeves counterclockwise (ccw) allows sliding movement of the rocker arm fulcrums, thereby disabling the valves; clockwise (cw) rotation of the sleeves prevents sliding movement of the fulcrums, thereby enabling the valves. The improved control includes a link and a spring interconnecting the disabler sleeves for each valve pair. Each link rotates the intake valve disabler sleeve ccw in response to ccw rotation of the exhaust valve disabling sleeve. A slot connecting each link to the intake valve disabler sleeve allows cw rotation of the exhaust valve disabler sleeve before cw rotation of the intake valve disabler sleeve. Each spring provides a cw biasing force to the sleeves. The biasing force increases in response to ccw rotation of the sleeves. Actuation of a second valve disabler pair in response to exhaust valve disabler actuation of a first valve disabler pair is provided by a spring-link and slot arrangement interconnecting the exhaust valve disabler sleeves of two valve pairs.

8 Claims, 2 Drawing Figures

U.S. Patent     Oct. 28, 1980     4,230,076
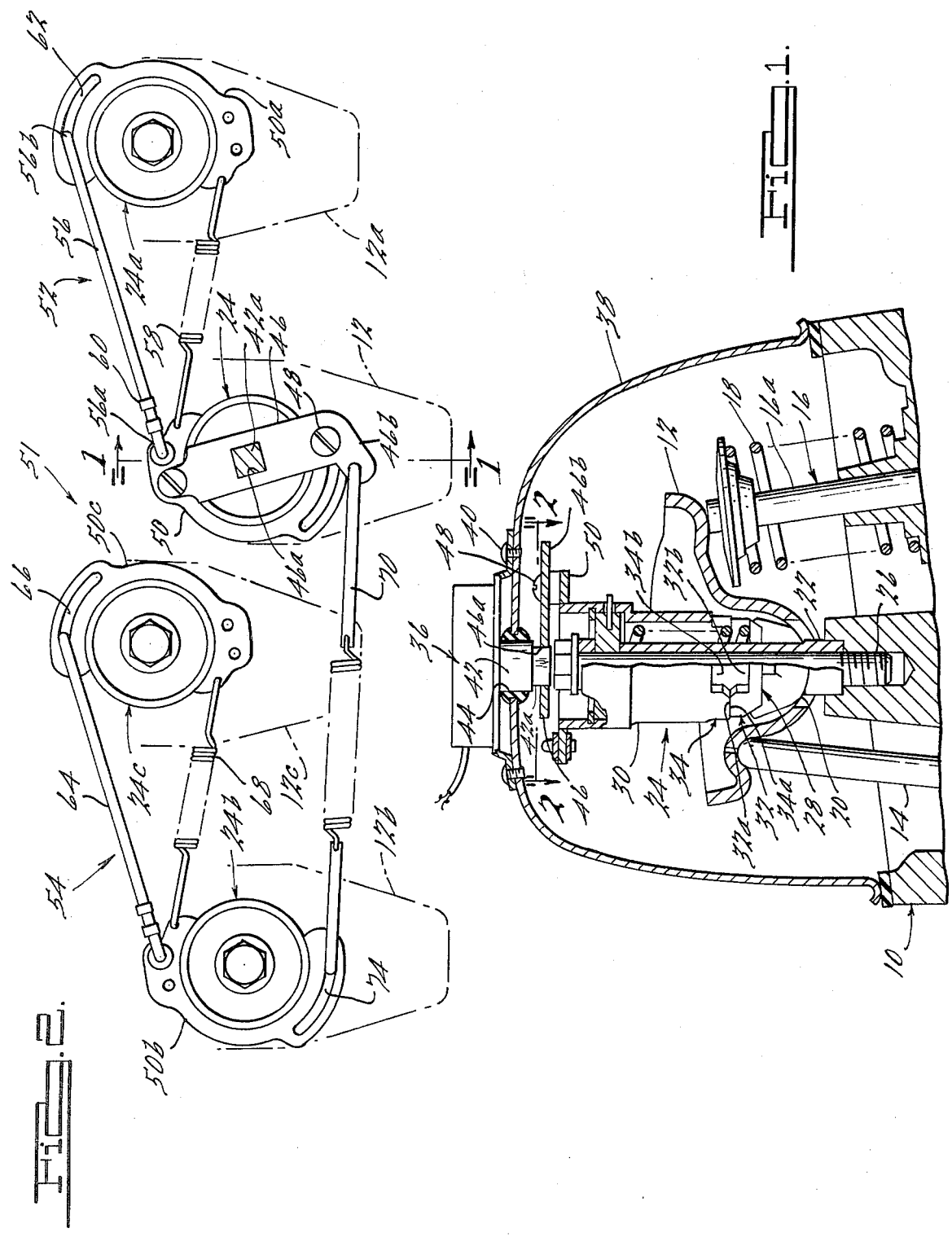

CONTROL FOR VALVE DISABLERS

BACKGROUND OF THE INVENTION

1. Field of the Invention

The invention relates to valve disablement and more specifically to a control for actuating valve disablers.

2. Description of the Prior Art

The concept of deactivating selected cylinders of an engine by disabling the valves associated with the selected cylinders is old. When this concept is applied to an Otto Cycle Engine, pumping or throttling losses are reduced, thereby improving engine efficiency during part throttle operation. U.S. patent application Ser. No. 578,295, filed May 16, 1975 and assigned to the assignee of this invention, discloses a valve disabler which is simple and inexpensive and which overcomes many of the disadvantages of prior art disablers. This application discloses an improved disabler control adaptable to control the disabler in the mentioned application.

SUMMARY OF THE INVENTION

An object of this invention is to provide a simple, low cost, reliable, and fail safe control for valve disablers.

According to a feature of this invention, the intake and exhaust valves of two valve pairs are each provided with a valve disabler moveable between a valve disabling position and enabling position; an actuator provides a force for moving a first pair of the disablers to the disabling position and a spring interconnecting the two pairs of disablers provides a force for moving the second pair of disablers to the disabling position in response to the first pair moving to the disabling position.

BRIEF DESCRIPTION OF THE DRAWINGS

The preferred embodiment of the invention is shown in the accompanying drawings in which:

FIG. 1 is a somewhat schematic view of an exhaust valve and its associated drive train which is provided with a valve disabler; and FIG. 2 is a somewhat schematic view of a control arrangement for the valve disablers of two valve pairs in one bank of a V-8 engine.

DESCRIPTION OF FIG. 1

FIG. 1 schematically illustrates a portion of a valve drive train for a V-8 engine having a partially shown cylinder head 10. The illustrated portion includes a rocker arm 12, a push rod 14, a valve stem 16a of a partially shown exhaust valve 16 biased closed by a spring 18, and a fulcrum 20 slideably disposed on a shaft 22 of a valve disabler 24. Shaft 22 is securely fixed to head 10 by a bolt 26.

Disabler 24 includes a non-rotatable latch 28 mounted for sliding movement with fulcrum 20 and a non-slidable sleeve 30 mounted for partial rotation about shaft 22. Latch 28 includes a plurality of circumferentially spaced teeth 32 defining abutting surfaces 32a and spaces 32b. Sleeve 30 includes a plurality of circumferentially spaced teeth 34 defining abutting surfaces 34a and spaces 34b. When surfaces 32a and 34a abut, sliding movement of fulcrum 20 is prevented, thereby enabling valve 16, i.e., valve 16 opens and closes in the conventional manner in response to movement of push rod 14. When surfaces 32a and 34a align, respectively, with spaces 34b and 32b, fulcrum 20 slides on shaft 22 in response to push rod movement, thereby disabling valve 16.

A more detailed description of valve disabler 24 may be found in patent application Ser. No. 578,295, filed May 16, 1975 and assigned to the assignee of this application.

An actuating force to rotate sleeve 30 from the enabling position, as shown, to the disabling position is provided by rotary solenoid actuator 36. Solenoid actuator 36 is secured to a valve cover 38 by screws 40 and includes a shaft 42 extending through a gromet sealed hole 44 in the cover. Shaft 42 has a square end 42a received in a mating hole 46a of a cross plate 46. The cross plate is secured by screws 48 to a flange 50. The flange is welded to sleeve 30. Flange 50 and cross plate 46 are best seen in FIG. 2.

DESCRIPTION OF FIG. 2

FIG. 2 illustrates a control arrangement 51 for two intake and exhaust valve pairs 52 and 54 in one four cylinder bank of a V-8 engine. The ohter four cylinder bank (not shown) is provided with a similar control arrangement. The controls disable the intake and exhaust valve pairs of four of the eight engine cylinders. The four cylinders are chosen so that the power pulses of the other four cylinders are evenly spaced in terms of crankshaft rotation.

Valve pairs 52 and 54 are provided with identical valve disablers 24, 24a, 24b and 24c having identical flanges 50, 50a, 50b and 50c, respectively. Valve disablers 24 and 24a of valve pair 52 are associated, respectively with the exhaust valve rocker arm 12, and an intake rocker arm 12a. Valve disablers 24b and 24c of valve pair 54 are associated, respectively with an exhaust valve rocker arm 12b and an intake rocker arm 12c.

The control arrangement for valve pair 52 includes the flanges 50 and 50a, a disabling link 56, a return or enabling spring 58 and the cross plate 46. An end 56a of link 56 is bent and pivotally received in a hole in flange 50 and retained by a clip 60. The other end 56b is bent and slideably received in a slot 62 in flange 50a and retained by an unshown clip. Slot 62 provides a lost motion between flanges 50 and 50a, whereby link 56 may be loaded in tension to rotate flange 50a ccw but not in compression to rotate flange 50a cw. Spring 58 biases the flanges and their respective disabler sleeves cw to their valve enabling positions with a force that increases in response to ccw rotation of the flanges.

The control arrangement for valve pair 54 includes flanges 50b and 50c, a link 64, a slot 66 in flange 50c, a spring 68, and a spring link 70. Spring link 70 is pivotally secured at one end to an extention 46b of cross plate 46 and slideably received at the other end in a slot 74 in flange 50b. Link 70 applies a ccw force to flange 50b in response to ccw rotation of flange 50 by solenoid 36. The spring in link 70 allows ccw rotation of flange 50 before ccw rotation of flange 50b. Valve pairs 52 and 54 may be made totally independent of each other by removing spring link 70 and providing each pair with a solenoid and cross plate.

Selective energization of solenoid 36 torques shaft 42 ccw and provides a force effective to rotate flanges 50 and 50a, via link 56, only when the exhaust valve and intake valve associated with disablers 24 and 24a are inactive, i.e., the ccw force is ineffective to rotate the disabler sleeves when the associated rockers are moving the valves. Solenoid 36 also applies the counterclockwise force to flange 50b via spring link 70. The conditions for ccw rotation of flanges 50b and 50c are the same as those for flanges 50 and 50a. The spring in spring link 70 allows rotation of flanges 50 and 50a of valve pair 52 before flanges 50b and 50c of valve pair 54, thereby increasing the shift time available for disabling the two valve pairs, since the number of crankshaft degrees that both valve pairs are inactive at the same time is less than the number of crankshaft degrees that the valve pairs are individually inactive.

Control arrangement 51 is made fail safe by springs 58 and 68 which apply their enabling forces to their respective disablers whether solenoid 36 is selectively deenergized or fails due to a malfunction. The springs are effective to rotate their associated valve disabler sleeves to the enabling position only when the associated valves are inactive. Springs 58 and 68 and their respective links 56 and 64 insure activation of the exhaust valve of each valve pair before the intake valve of each valve pair. Slots 62 and 66 allow rotation of the exhaust valve disabler sleeves to the enabling position before rotation of the intake valve disabler sleeves. Should the intake valve of a disabled cylinder be enabled before the exhaust valve, hot cylinder gases will blow into the engine manifold, thereby disrupting fuel metering and probably causing backfire. The lost motion provided by slots 62 and 66 increases the shifting time available for enabling the disablers. For example, in one particular V-8 engine the intake and exhaust valves of each valve pair are inactive at the same time for 209 crankshaft degrees and individually inactive for a total 684 crankshaft degrees, thereby lengthening the shift time by a factor in excess to three.

A preferred embodiment of the invention has been disclosed for illustrative purposes. Many vairations and modifications of the preferred embodiment are believed to be within the spirit of the invention. For example, the disabler sleeves and their respective flanges could be modified to rotate cw for disabling and ccw for enabling, spring 58 of valve pair 52 and its counter part of valve pair 54 could be replaced by two grounded springs, slots 62 and 66 could be dispensed with if shifting time is not critical, or spring link 70 could be dispensed with if individual actuation of each valve pair is desired. The following claims are intended to cover the inventive portions of the preferred embodiment and variations and modifications within the spirit of the invention.

What is claimed is:

1. In an internal combustion engine having means controlling valve disablement of selected intake and exhaust valve pairs, said selected intake and exhaust valves each provided with a valve disabler having means moveable between a valve enabling position and a valve disabling position, said improved control means comprising:

actuator means operative when energized to apply an actuating force tending to move the moveable means of one valve pair to the disabling position and operative to effect such movement when the valves associated with said one valve pair are inactive; and means interconnecting the moveable means of one valve pair with the moveable means of the other valve pair for effecting movement of the moveable means of the other valve pair to the disabling position in response to movement of the moveable means of said one valve pair to the disabling position, said interconnecting means operative to allow disablement of said one valve pair before disablement of said other valve pair, whereby two valve pairs may be disabled by one actuator without decreasing the time available for moving the disablers to their disabling positions.

2. The improved means of claim 1, wherein said interconnecting means includes:

a spring allowing disabling movement of said one valve pair and operative to apply an actuating force tending to move the moveable means of the other valve pair to the disabling position in response to the disabling movement of said one valve pair.

3. The improved means of claim 1, wherein said moveable means is rotatable to said enabling and disabling positions and wherein said interconnecting means includes:

a spring connecting one of the rotatable means of said one valve pair with one of the rotatable means of the other valve pair and operative to apply an actuating force tending to rotate the rotatable means of said other valve pair in response to the disabling movement of said one valve pair.

4. The improved means of claim 3, wherein said spring is connected to the rotatable means associated with the exhaust valves of each valve pair.

5. An improved means for controlling enablement and disablement of first and second pairs of intake and exhaust valves normally opened and closed in response to periodic forces in a valve drive train of an internal combustion engine, said improved means comprising:

first and second pairs of valve selector means adapted to be associated with the first and second pairs of valves, said valve selector means each having means selectively rotatable between a valve enabling position allowing normal opening of the valves by the periodic forces and a valve disabling position preventing opening of the valves by the periodic forces;

first and second linkage means pivotally connecting, respectively, the rotatable means of said first and second pairs of valve selector means;

actuation means operative when energized to rotate the rotatable means of first pair of valve selector means to said valve enabling positions; and means interconnecting one of the rotatable means of said first pair of valve selector means with one of the rotatable means of said second pair of valve selector means for effecting rotation of the rotatable means of the valve selector means associated with the other pair of intake and exhaust valves in response to rotation of said one rotatable means to the valve disabling position.

6. The improved means of claim 5, wherein said interconnecting means includes:

a spring connecting said one rotatable means to said other rotatable means and operative to apply an increasing force for rotating said other rotatable means to said valve disabling position in response to rotation of said one rotatable means to said valve disabling position.

7. The improved means of claim 5, further including first and second return means respectively associated with the rotatable means of said first and second pairs of selector means for returning said rotatable means to said valve enabling positions where said actuator means is deenergized and wherein said interconnecting means includes:

lost motion means associated with said interconnecting means and operative to allow rotation of said one rotatable means to said valve enabling position before rotation of said other rotatable means to said valve enabling position.

8. The improved means of claim 7, wherein interconnecting means includes:

a spring connecting said rotatable means to said other rotatable means and operative to apply an increasing force for rotating said other rotatable means to said valve disabling position in response to rotation of said one rotatable means to said disabling position.

* * * * *